United States Patent
Lirov et al.

Patent Number: 5,235,508
Date of Patent: Aug. 10, 1993

[54] AUTOMATED RESOURCE ALLOCATION CUTTING STOCK ARRANGEMENT USING RANDOM CUT PATTERNS

[75] Inventors: Yuval V. Lirov, Aberdeen; Moshe Segal, Tinton Falls, both of N.J.

[73] Assignee: AT&T Bell Laboratories, Murray Hill, N.J.

[21] Appl. No.: 531,174

[22] Filed: May 31, 1990

[51] Int. Cl.$^5$ .............................................. G06F 15/46
[52] U.S. Cl. ................................. 364/402; 264/474.13
[58] Field of Search ................... 364/402, 401, 474.09, 364/474.13, 474.15, 469, 470, 471

[56] References Cited

U.S. PATENT DOCUMENTS

| T918,013 | 1/1974 | Dunham et al. | 364/474.15 |
|---|---|---|---|
| 3,339,182 | 8/1967 | Horwitz et al. | 364/470 |
| 3,488,479 | 1/1970 | Keyes et al. | 364/471 |
| 4,885,686 | 12/1989 | Vanderbei | 364/402 |
| 4,947,322 | 8/1990 | Tenma et al. | 364/401 |
| 5,077,661 | 12/1991 | Jain et al. | 364/474.15 |
| 5,128,860 | 7/1992 | Chapman | 364/401 |

OTHER PUBLICATIONS

N. Metropolis et al., "The Monte Carlo Method", *Journal of the American Statistical Assn.*, vol. 44, No. 247, Sep. 1949, pp. 335–341.

R. W. Haessler, "Selection and Design of Heuristic Procedures For Solving Roll Trim Problems", *Journal of the Institute of Management Sciences*, vol. 34, No. 12, Dec. 1988, pp. 1460–1471.

*Primary Examiner*—Robert A. Weinhardt
*Attorney, Agent, or Firm*—F. B. Luludis

[57] ABSTRACT

An arrangement is disclosed for allocating a constrained common resource among a plurality of demands for the resource. The arrangement includes generating a set of patterns as candidates for a recommended solution, setting goals or constraints for a pattern to meet before the pattern becomes a candidate for the recommended solution, searching the set of patterns and determining those patterns that meet the goals, and appending those patterns that meet the goals to the recommended solution. A random distribution based on the demand for the resource over a multi-dimension space can be generated. Responsive to the random distribution, a plurality of feasible patterns can be generated. Responsive to the feasible patterns, a multiplicity ratio may be generated. Responsive to a multiplicity ratio and to its corresponding feasible pattern, the plurality of feasible patterns may be reduced to a single feasible pattern, which can be included in the recommended solution. The generating and reducing can be repeated until the goals are met whereupon the resultant multiplicity ratios and feasible patterns can be provided as the recommended solution, and, responsive to the recommended solution, the common resource can be allocated among the plurality of demands.

8 Claims, 3 Drawing Sheets

FIG. 3

| $\overline{W}=91$ | | | | |
|---|---|---|---|---|
| 30 | 20 | 20 | 10 | 10 |
| 30 | 20 | 20 | 10 | 10 |
| 30 | 20 | 20 | 10 | 10 |
| 30 | 20 | 20 | 10 | 10 |
| 30 | 20 | 20 | 10 | 10 |
| 30 | 20 | 20 | 10 | 10 |
| 30 | 20 | 20 | 10 | 10 |
| 30 | 20 | 20 | 10 | 10 |
| 30 | 20 | 20 | 20 | |
| 30 | 20 | 20 | 20 | |
| 30 | 30 | 20 | 10 | |

8 (rows of first group), 2 (rows of second group), 1 (last row)

1 = WASTE

AUTOMATED RESOURCE ALLOCATION CUTTING STOCK ARRANGEMENT USING RANDOM CUT PATTERNS

BACKGROUND OF THE INVENTION

1. Field of the Invention

This invention relates to resource allocation and, more particularly, to allocating a constrained common resource among a plurality of demands for the resource.

2. Description of the Prior Art

The term "resource allocation" problem applies to that class of problems, which has as a common characteristic the need to physically allocate a restricted or constrained common resource among a plurality of demands for the resource. The term "cutting stock" problem relates to a kind of resource allocation problem, which is usually found in a manufacturing or transportation environment, where the common resource and the demands for the resource have geometric meaning or interpretation. For example, the article by R. W. Haessler entitled "Selection and Design of Heuristic Procedures for Solving Roll Trim Problems," Journal of the Institute of Management Sciences, Vol. 34, No. 12 (December 1988), pp 1460–1471 discloses a cutting stock problem that relates to a paper mill, which produces large rolls of paper, and specifically to a heuristic procedure for solving one-dimensional roll trimming, or cutting, or slicing a large width roll or rolls of paper into a plurality of smaller width rolls of paper. The pragmatic significance of the heuristic procedure is keyed to the fact that it is common in the paper mill industry to cut a large width roll or rolls into a plurality of smaller width rolls of paper. Relating the resource allocation problem and the cutting stock problem to the paper mill example, it may be noted that the large roll corresponds to a constrained common resource while the smaller rolls correspond to a plurality of demands for the resource.

In the process of cutting a large roll of paper, there is usually a large number of alternative settings for the knives which are used to cut the large roll into the plurality of smaller rolls. Ideally, it is desired that the knives be set and, perhaps, reset several times in such a way that the large roll would be cut into a plurality of smaller rolls without leaving any waste. Unfortunately, the ideal setting of the knives is seldom achieved for at least two reasons. One, the sum of the widths of the smaller rolls may not equal the width of the large roll. Second, even if the sum of the widths of the smaller rolls does equal the width of the large roll, the number of alternative settings for the knives may be so large that the time to find the ideal setting may be prohibitively long and, hence, is likely to be cost ineffective.

In light of the above, it is common to settle on a solution which may have some waste but which balances waste against the time to find a recommended setting of the knives. Notwithstanding, known processes to find a recommended solution of the allocation of the constrained common resource to meet the plurality of demands still require excessive amounts of time and, therefore, a more timely solution remains needed in the industry.

SUMMARY OF THE INVENTION

This and other problems are solved in accord with the principles of our invention which includes a method and apparatus for allocating a constrained common resource among a plurality of demands for the resource. The arrangement includes generating a set of patterns as candidates for a recommended solution, setting goals or constraints for a pattern to meet before the pattern becomes a candidate for the recommended solution, searching the set of patterns and determining those patterns that meet the goals, and appending those patterns that meet the goals to the recommended solution. A random distribution based on the demand for the resource over a multi-dimension space can be generated. Responsive to the random distribution, a plurality of feasible patterns can be generated. Responsive to the feasible patterns, a multiplicity ratio may be generated. Responsive to a multiplicity ratio and to its corresponding feasible pattern, the plurality of feasible patterns may be reduced to a single feasible pattern, which can be included in the recommended solution. The generating and reducing can be repeated until the goals are met whereupon the resultant multiplicity ratios and feasible patterns can be provided as the recommended solution, and, responsive to the recommended solution, the common resource can be allocated among the plurality of demands.

BRIEF DESCRIPTION OF THE DRAWINGS

Our invention should become more apparent from the following detailed description when taken in conjunction with the accompanying drawing in which:

FIG. 3 illustrates a recommended solution for allocating a constrained common resource among a plurality of demands where the solution is a result that is obtained by applying the principles of our invention to the numerical example illustrated in FIG. 2.

DETAILED DESCRIPTION

Figure 1:
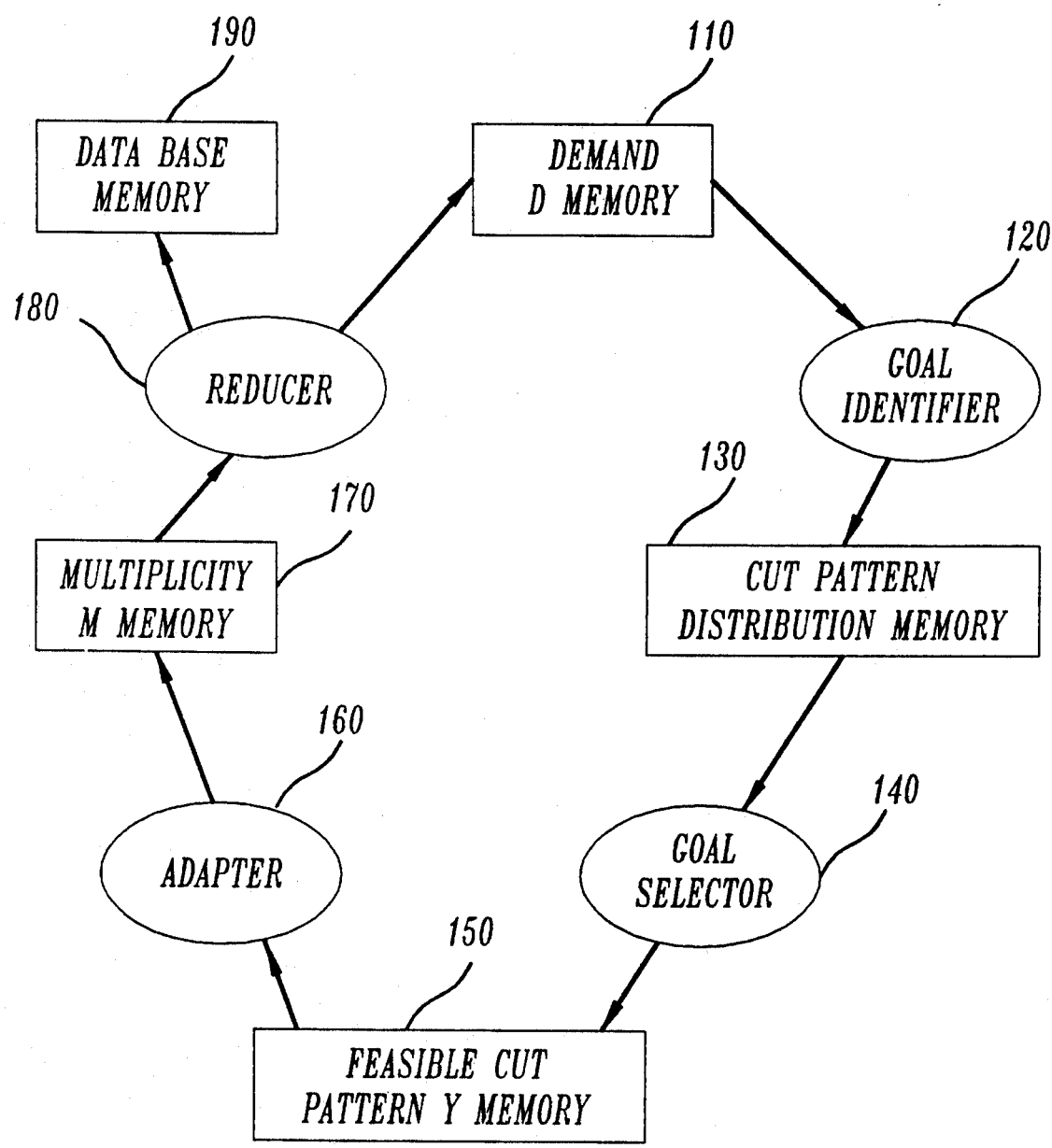
FIG. 1 is a block diagram illustrating a controller process for practicing the present invention and FIG. 2 illustrates a methodology according to the principles of our invention through the use of a numerical example, which is helpful in understanding those principles

To aid in understanding the principles of our invention, we choose to use, by way of an example and not by way of limitation, a paper mill production process. Consider a large roll of paper having a width $\overline{W}$. For purposes of our description, the length of the large roll is assumed to be significantly long relative to its width $\overline{W}$. It may be noted that the large roll is also called a log-roll in the art. While not limiting the principles of our invention, the large length-to-width assumption allows us to describe an illustrative embodiment of the principles of our invention without infecting the description with unnecessary dialogue about the length of the log-roll.

Consider also that a log-roll is to be cut into a plurality of smaller width rolls, each smaller roll having its own width $W_i$ where i equals 1 through I, in order to meet the plurality of demands $D_i$ that are placed on the common resource, i.e. on the log-roll. For any specific width $W_i$, it may be desired that there be one or more rolls of that width $W_i$. The symbol $D_i$ identifies the total number of smaller rolls of width $W_i$ required to meet the demand of the customer while the symbol I identifies the total number of different widths $W_i$ such that each width $W_i$ is different than another width $W_j$ if i and j are different. Clearly the demand of one or more customers can be viewed as a demand vector D with I demand elements $D_i$ where each demand element $D_i$ could be the sum of the demands of several customers, while the smaller widths can be viewed as a width vector W with I smaller width elements $W_i$. Hence, the total demand TD of one or more customers may be said to be equal to a vector product $D \times W$, or:

$$D \times W = TD,$$

or $$D_1 \times W_1 + D_2 \times W_2 + \ldots + D_I \times W_I = TD \quad (1).$$

Further, and as mentioned earlier, we do not need to worry about the length of either the large roll or any of the smaller rolls. That worry can go away by considering the length of each cut to be normalized and, in that manner, we can remove the length variable as a factor that needs further elaboration in a description of an illustrative embodiment of the principles of our invention. However, as an aside, it is worth noting that the minimum number of normalized lengths of the log-roll is equal to the quotient of the total demand TD divided by the width of the log-roll $\overline{W}$.

Still further and worth emphasizing, any cut of the log-roll can include one or more cuts of any specific width $W_i$, e.g. a single cut of the log-roll could include a plurality of cuts of the same width $W_i$. Indeed, a single cut of the log-roll could include up to $D_i$ cuts of the same width $W_i$.

We now define the term "cut pattern". A cut pattern identifies a specific setting of the knives so as to cut a specific pattern of smaller rolls from the log-roll. As an aside, we assume that the length of the cut pattern will be some normalized length. We also assume that there will likely be a plurality of cut patterns, each of the normalized length. Only when the plurality of cut patterns is actually cut from the log-roll can the customer's demand be met. Continuing, a cut pattern may be expressed as a cut pattern vector Y of integer numbers where the cut pattern vector Y is also of dimension I and where each respective element $Y_i$ of cut pattern vector Y identifies the number of smaller rolls of width $W_i$ which are to be cut from the log-roll of width $\overline{W}$ during one roll trimming operation, i.e. during one cut of one normalized length of the log-roll.

We now define the term "feasible cut pattern". A feasible cut pattern is a specific kind of cut pattern, i.e. a feasible cut pattern is a cut pattern that satisfies certain constraints, which constraints are one form of goal to be satisfied. One constraint or goal that must be satisfied by a feasible cut pattern is that the vector product $Y \times W$ must not exceed the width $\overline{W}$ of the log-roll, i.e.:

$$Y \times W \leq \overline{W},$$

or $$Y_1 \times W_1 + Y_2 \times W_2 + \ldots + Y_I \times W_I \leq \overline{W} \quad (2).$$

Still other constraints or goals can be imposed on a cut pattern before it may be treated as a feasible cut pattern. The other constraints typically arise in response to process or technological limitations and to manufacturing and transportation costs. However, for purposes of describing an illustrative embodiment of the principles of our invention, and not by way of limitation, we choose to use the constraint of equation (2) in this description. If a cut pattern vector Y meets all of the constraints of a particular application, it becomes known as a feasible cut pattern and is also symbolized as a feasible cut pattern vector Y. Note that feasible cut patterns are a subset of cut patterns.

We now define the term "multiplicity". Note that a feasible cut pattern Y may not satisfy all of the demand D because it must also satisfy one or more constraints such as the constraint of equation (2). As a result, the feasible cut pattern Y may have one or more of its elements $Y_i$, which have a value of $Y_i$ that is less than the corresponding demand $D_i$. In such an event, it will be necessary that there be more than one occurrence of that width $W_i$, and perhaps the cut pattern, in the recommended solution for the trimming of the log-roll, i.e. that width $W_i$ will need to be repeated in the same or in a different cut pattern. If two or more cut patterns are identical, then it is said that there is a multiplicity of that cut pattern. In particular, if there are two occurrences of a specific cut pattern, the multiplicity value of that cut pattern is said to be of value two. If there are three occurrences of a specific cut pattern, the multiplicity value of that cut pattern is said to be of value three, etc. Extending this definition, a unique cut pattern is said to have a multiplicity of value one.

The problem to be solved in accord with the principles of our invention can be restated to be the timely generating of feasible cut patterns together with their respective multiplicities so as to satisfy the demand of one or more customers on the one hand, consistent with reducing waste on the other hand.

The proposed arrangement includes a recursive solution that includes four sets of rules, which can be arranged as illustrated in FIG. 1, and five memories, all of which may be suitably embodied in software and memory devices.

In our illustrative embodiment, the four sets of rules are embodied respectively in goal identifier 120, goal selector 140, adapter 160 and reducer 180, while the five memories are embodied in first demand memory 110, second cut pattern distribution memory 130, third feasible cut pattern memory 150, fourth multiplicity memory 170 and fifth data base memory 190.

The first memory 110 contains the customer demand vector D and, hence, its plurality of demand elements $D_i$ for the common resource. Responsive to demand vector D, goal identifier 120 generates a multi-dimension random distribution function of a cut pattern as the multi-dimensional random variable and stores the multi-dimension random distribution function in second memory 130. Responsive to the random distribution function, goal selector 140 randomly generates a plurality of feasible cut patterns, which are stored in third memory 150. Responsive to the feasible cut pattern vectors Y and to the customer's demand D, adapter 160 generates multiplicity values M for the respective feasible cut patterns and stores the multiplicity values in fourth memory 170. Responsive to the multiplicity values M and to the feasible cut patterns Y and to the customer's demand D, reducer 180 generates residual demands RD, which are hereinafter defined, and selects a recommended feasible cut pattern Y, its multiplicity value M and its residual demand RD. The recommended feasible cut pattern and its multiplicity are stored in data base 190 for later use in adjusting the knives to cut the log-roll, i.e., they become part of a recommended solution for allocating the common resource among the plurality of demands. The respective residual demands RD from reducer 180 are substituted for the demand D in first memory 110 and the arrangement iterates until goal identifier 120 detects the customer's residual demand RD to be equal to or less than a design parameter, which reflects an allowable and acceptable tolerance for the waste, which in an ideal case would be zero.

More specifically, goal identifier 120 could generate a random distribution function, for example, a uniform random distribution function over a multi-dimensional interval, which would take the shape of a hyper-cube with vertices specified by the demand elements $D_i$, when viewed as coordinates in an I dimensional vector space. For example, if I equals two, then the hyper-cube is a two dimensional square with the vertices having the coordinates (0,0), (0,$D_2$), ($D_1$,0), and ($D_1$,$D_2$). In another example, if I equals three, then the hyper-cube is a three dimensional cube with the vertices having the coordinates (0,0,0), (0,$D_2$,0), ($D_1$,0,0), ($D_1$,$D_2$,0), (0,0,$D_3$), (0,$D_2$,$D_3$), ($D_1$0, $D_3$), and ($D_1$,$D_2$,$D_3$). Further details on generating random distribution functions over a multi-dimensional interval may be found in many standard textbooks on computer simulation such as the textbook by R. Y. Rubinstein, "Simulation and the Monte Carlo Method" New York: John Wiley, 1981.

More specifically, goal selector 140 could randomly generate a plurality of feasible cut patterns in the following manner.

Firstly, goal selector 140 generates a cut pattern vector Y with elements $Y_i$ for each i from 1 through I according to the random distribution function stored in second memory 130. Consider a cut pattern vector Y to be a random variable distributed according to the random distribution function in second memory 130. Then, a value for the cut pattern vector Y can be generated as a corresponding value for the random variable using a method for random variable generation such as may be found in the standard textbook aforecited by Rubinstein.

Secondly, goal selector 140 analyzes the generated cut pattern to determine whether or not the generated cut pattern satisfies the imposed constraints or goals such as the constraint represented by equation (2) as well as any other constraints or goals, i.e. goal selector 140 determines whether or not the generated cut pattern is a feasible cut pattern.

Thirdly, goal selector 140 repeats the above two stages until a predetermined number of feasible cut patterns is obtained and the generated plurality of feasible cut patterns is stored in third memory 150.

To exemplify the above three stages, it ought to be noted that the first and second stages could be intertwined or could be done concurrently as a parallel process to more timely generate a predetermined number of feasible cut patterns. For example, starting with an empty cut pattern vector Y, i.e. all elements of the cut pattern vector are zero, one could generate a discrete probability distribution vector P having probability elements $P_i$ defined as:

$$P_i = \frac{D_i}{\sum_{j=1}^{I} D_j} \quad (3)$$

Next, we randomly select an integer i according to probability $P_i$. Thereupon, element $Y_i$ of the empty cut pattern vector Y is incremented by the integer one and the thusly updated cut pattern vector Y is analyzed to determine whether or not the imposed constraints or goals are satisfied. In the event the goals are not satisfied, the immediately prior non-empty cut pattern is saved as a feasible cut pattern, the initial customer demand vector D is reloaded, the current cut pattern is rejected and we restart the iterative process with a new empty cut pattern. In the event the goals are satisfied, the discrete probability distribution vector P is updated by decrementing demand element $D_i$ by one and recalculating the distribution vector P and thereafter randomly selecting another integer i accordingly to updated probability element $P_i$. The process iterates until predetermined number of feasible cut patterns is generated.

More specifically, adapter 160 could generate a multiplicity value M for each of the plurality of feasible cut patterns stored in third memory 150 by the following methodology.

Firstly, a multiplicity ratio $X_i$ is generated for each value of i from 1 through I for which there is a feasible cut pattern element $Y_i$ that is greater than zero according to the following relationship:

$$X_i = \frac{D_i}{Y_i} \quad (4)$$

Secondly, having generated a plurality of multiplicity ratios $X_i$, adapter 160 selects the smallest multiplicity ratio $X_i$ corresponding to a feasible cut pattern Y, truncates any fractional remainder from the smallest multiplicity ratio $X_i$ from equation (3), and assigns the integer part of the smallest $X_i$ as an upper limit $\overline{M}$ of the multiplicity value M for that feasible cut pattern Y. Accordingly, the multiplicity value for a feasible cut pattern Y is symbolized as M where M can have any value between zero and the upper limit $\overline{M}$, i.e., $0 \leq M \leq \overline{M}$.

Thirdly, adapter 160 repeats the above two stages until a multiplicity value M is generated for every feasible cut pattern Y and the generated plurality of multiplicity values is stored in fourth memory 170.

More specifically, reducer 180 could generate residual demands RD by using customer demand D from first memory 110 and the plurality of multiplicity values M from fourth memory 170 and the plurality of feasible cut patterns Y from third memory 150 to update the customer demand in first memory 110 and to select one multiplicity value M as well as its corresponding feasible cut pattern Y to be stored in data base 190 as a part of the recommended solution to the allocation of the constrained common resource among the plurality of demands for the resource.

Firstly, reducer 180 generates a residual demand vector RD for each feasible cut pattern Y by subtracting the vector product of the feasible cut pattern Y and its scalar multiplicity value M from the customer demand D, or $$\text{Residual demand } (RD) = D - Y \times M \quad (5)$$

where D is the demand vector, Y is the feasible cut pattern vector, and M is the multiplicity scalar value. (Note equation (5) is vector arithmetic and therefore involves element-by-element arithmetic.)

Secondly, reducer 180 evaluates each of the plurality of residual demands in the following manner. Each residual demand vector RD also has I residual demand elements $RD_i$. Reducer 180 selects the largest residual demand element in the residual demand vector, called Max $RD_i$, and divides the value of the largest element Max $RD_i$ by the multiplicity value M of the feasible cut pattern Y that was used in generating the residual demand RD according to equation (5). The resultant quotient is called the evaluation ratio ER for that feasible cut pattern Y, or:

$$ER = \frac{Max\ RD_i}{M} \qquad (6)$$

and the evaluation ratio is temporarily stored. Of course, other forms of evaluation ratio ER are possible. For example, any polynomial function of $MaxRD_i$ and M would be a satisfactory evaluation ratio, consistent with the principles of our invention.

Reducer 180 repeats the evaluation process for each of the plurality of residual demands RD (there being a residual demand vector RD for each feasible cut pattern Y), which results in a corresponding plurality of corresponding evaluation ratios.

Thirdly, reducer 180 selects (a) the residual demand vector RD, (b) the feasible cut pattern vector Y used to generate that residual demand vector, and (c) the multiplicity value M of that feasible cut pattern vector, all of which are in one-to-one correspondence with the smallest quotient generated in the evaluation process, i.e. the smallest of the evaluation ratios.

Fourthly, reducer 180 (a) replaces the demand D stored in first memory 110 with the residual demand RD selected in the third stage above, i.e. with that residual demand corresponding to the smallest evaluation ratio, and (b) stores, in data base 190, the feasible cut pattern Y and its multiplicity value M selected in the third stage above as a part of the recommended solution.

Figure 2:
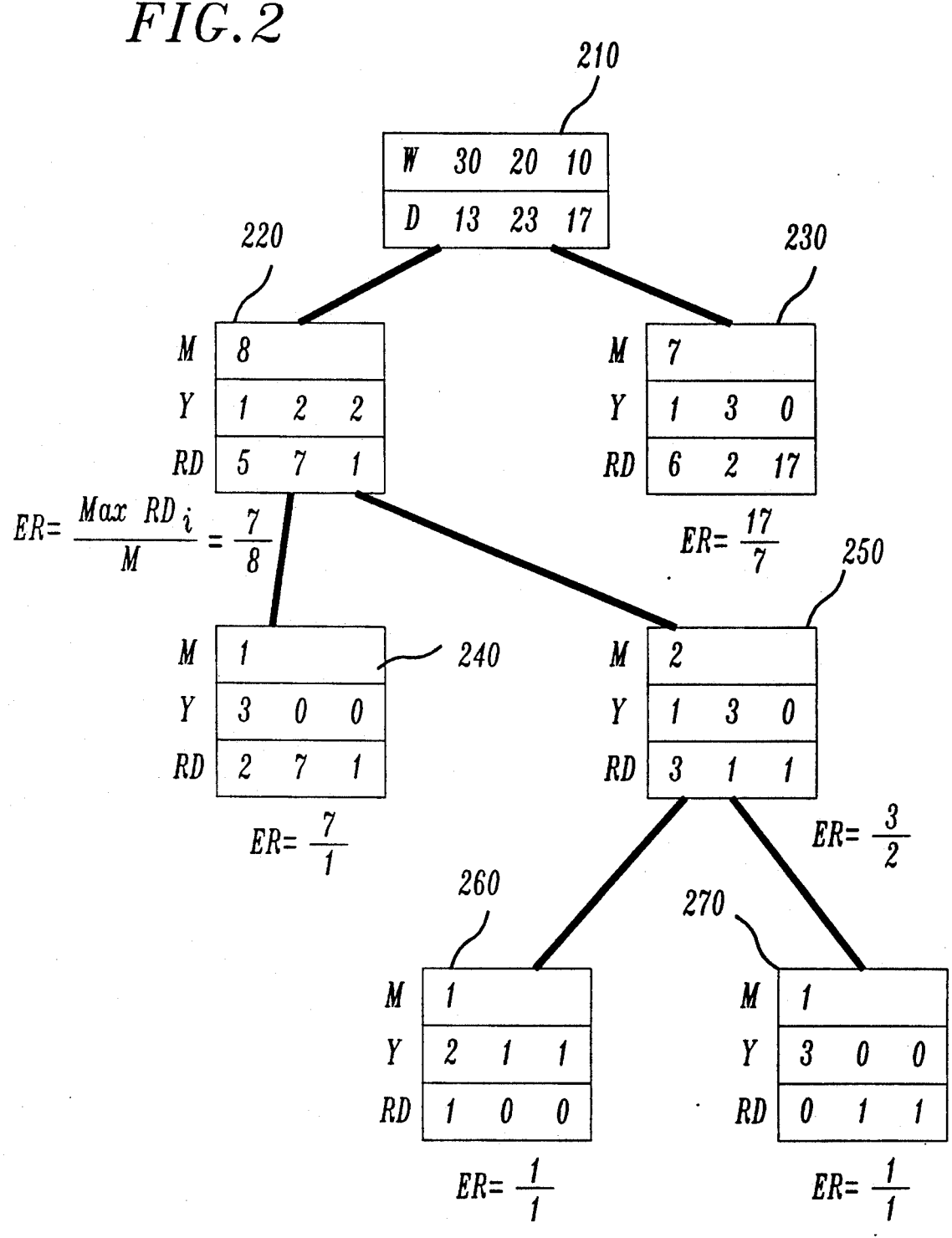

We now refer to FIG. 2 for a numerical example that illustrates the principles articulated above. Consider a large width roll of paper, i.e. the log-roll, of width $\overline{W}$ equal to 91 units. Next, consider a requirement to cut the log-roll into ($D_1=$) 13 smaller rolls, each of width ($W_1=$) 30 units, and into ($D_2=$) 23 smaller rolls, each of width ($W_2=$) 20 units, and finally into ($D_3=$) 17 smaller rolls, each of width ($W_3=$) 10 units. Using the above symbology:

$$\overline{W}=91 \qquad (7)$$

$$W=(30,20,10)=(W_1,W_2,W_3) \qquad (8)$$

$$D=(13,23,17)=(D_1,D_2,D_3) \qquad (9).$$

Note the symbology of equations (7), (8) and (9) has been transferred to, and is shown in, item 210 of FIG. 2 for use in this numerical example.

Goal identifier 120 generates a random distribution function over a multi-dimensional interval, for example, a uniform random distribution function which would take the shape of a cube with vertices specified by the demands $D_i$ viewed as coordinates in the (I=) 3 dimensional vector space.

Goal selector 140 generates a plurality of feasible cut patterns. In so doing this, goal selector 140 randomly generates a plurality of cut patterns Y, two respective ones of which are shown in items 220 and 230 of FIG. 2. Goal selector 140 analyzes the cut patterns Y to determine whether or not the cut patterns Y satisfy certain constraints or goals, e.g. the constraint represented by equation (2). In this case, note from the W vector in item 210 and from the Y vector in item 220 that:

$$Y_1 \times W_1 + Y_2 \times W_2 + Y_3 \times W_3 \leq \overline{W},$$

or $$1 \times 30 + 2 \times 20 + 2 \times 10 = 90 \leq 91 \qquad (10)$$

Hence, the cut pattern Y in item 220 is a feasible cut pattern. But, as mentioned earlier, there are likely to be a plurality of cut patterns generated and each generated cut pattern is to be examined for the purpose of determining which one or ones of the generated cut patterns is or are also a feasible cut pattern or patterns. In our example, item 230 illustrates still another feasible cut pattern.

Adapter 160 generates multiplicity value M for each feasible cut pattern Y. Note that, by use of the multiplicity ratios $X_i$ from equation (4), eight repetitions of the feasible cut pattern in item 220 is the maximum possible number of cuts using that feasible cut pattern without exceeding the customer's demand D. Note that, if there were nine repetitions of the feasible cut pattern in item 220, then there would be 18 small rolls of width ($W_3=$) 10 whereas the demand $D_3$ for that width ($W_3=$) 10 was only 17. Therefore, the upper limit $\overline{M}$ of multiplicity value M of the feasible cut pattern Y in item 220 has a value of eight, i.e. $\overline{M}=8$. In this example, we will assume $M=\overline{M}$. As to feasible cut pattern Y, which is shown in item 230, it has a multiplicity value of seven.

Reducer 180 generates residual demand vector RD by using initial customer demand vector D from first memory 110 and the plurality of multiplicity values M from fourth memory 170 and the plurality of feasible cut patterns Y from third memory 150 to update the initial demand D in first memory 110 and to select one multiplicity value M as well as its corresponding feasible cut pattern Y to be stored in data base 190 as a part of the recommended solution. In this numerical example, reducer 180 generates the residual demand vectors RD illustrated in items 220 and 230 by determining the difference between the demand D in item 210 and the amount of that demand D that is satisfied by the multiplicity value M of the feasible cut pattern Y when that multiplicity value is applied to the feasible cut pattern. As to item 220, the residual demand RD that remains to be satisfied after eight, i.e. M=8, cuts of feasible cut pattern Y (remember that cut pattern Y=(1,2,2) was randomly generated and was then determined to be a feasible cut pattern) is a residual demand vector RD of ($RD_1$, $RD_2$, $RD_3$)=) (5,7,1). Now as to whether item 220 or whether item 230 will be used as a part of the recommended solution is conditioned on the evaluation ratio ER, here in our example, on the smallest ratio of the maximum residual demand element Max $RD_i$ to the multiplicity value M, i.e. upon the smallest evaluation ratio determined pursuant to equation (6). Here, note the maximum residual demand element of item 220 is seven, i.e. its Max $RD_i$ is $RD_2=7$, while the maximum residual demand element of item 230 is 17, i.e. its Max $RD_i$ is $RD_3=17$. Also, note that the evaluation ratio for item 220 is $\frac{7}{8}$ while the evaluation ratio for item 230 is 17/7. In accordance with our methodology, we recommend a solution with the smallest evaluation ratio, in this case the evaluation ratio of $\frac{7}{8}$ which corresponds to the feasible cut pattern in item 220.

In accord with the principles of our invention, the foregoing process then identifies item 220 as being a part of the recommended solution. Thereafter, the arrangement repeats the process to obtain items 240 and 250. Since item 250 has a feasible cut pattern and has the smaller evaluation ratio, it, i.e. item 250, is added or appended to the recommended solution and again the process repeats to items 260 and 270.

As earlier mentioned, the arrangement repeats the methodology until goal identifier 120 detects some predetermined tolerance that is deemed acceptable. In this example, assume that the acceptable tolerance is set in such a manner that no residual demand element shall exceed a value of one. That means that either of items 260 or 270 can be added to the recommended solution since they both include feasible cut patterns and since no element in their respective residual demands exceeds one.

Turning now to FIG. 3, the results of the numerical example in FIG. 2 are summarized in FIG. 3, i.e. we use FIG. 3 to illustrate how the iterative methodology combines the results to obtain a completed recommended solution.

First, item 220 of FIG. 2 recommended eight multiplicities, i.e., $M=8$, of feasible cut pattern $Y=(1,2,2)$ be cut from the log-roll in smaller widths $W=(30,20,10)$. Translating FIG. 2 into FIG. 3, note that the recommended solution includes the knives being set to cut the log-roll for one width of 30 units, two widths of 20 units, and two widths of 10 units. That cut is repeated eight times, each cut being of the aforesaid normalized length.

Second, item 250 of FIG. 2 recommended two multiplicities, i.e. $M=2$, of feasible cut pattern $Y=(1,3,0)$ be cut from the log-roll in smaller width $W=(30,20,10)$. Translated into FIG. 3, note that the recommended solution includes the knives being set to cut the log-roll for one width of 30 units, three widths of 20 units, and zero widths of 10 units. That cut is repeated two times, each cut being of the aforesaid normalized length.

Third, item 260 of FIG. 2 recommended one multiplicity, i.e. $M=1$, of feasible cut pattern $Y=(2,1,1)$ be cut from the log-roll in smaller width $W=(30,20,10)$. Translated into FIG. 3, note that the recommended solution includes the knives being set to cut the log-roll for two widths of 30 units, one width of 20 units, and one width of 10 units. That cut is performed one time and the one cut is of the aforesaid normalized length. Note here that we could have, alternatively, used the solution shown in item 270 as a part of the recommended solution.

Note that the waste using the recommended solution in our numerical example is only one unit for each of the eleven cuts of the log-roll.

Although our invention has been described and illustrated in detail using a log-roll trimming example, it is to be understood that the same is not by way of limitation. Hence, the spirit and scope of our invention is limited only by the terms of the appended claims.

We claim:

1. A method for allocating a constrained common resource among a plurality of different levels of demands for the resource, said method comprising the steps of:
   (a) generating a random distribution based on the plurality of demands for the resource,
   (b) generating as a function of the random distribution a plurality of feasible patterns each indicative of allocating the resource among the plurality of demands,
   (c) generating a multiplicity value for each of said feasible patterns as a function of the levels of the demands,
   (d) processing each said multiplicity value and its corresponding feasible pattern to reduce the plurality of feasible patterns to a single feasible pattern which meets a set of goals and which can be included in a partial recommended solution of allocating the resource, thereby reducing the levels of the demands to respective residual levels,
   (e) processing the residual levels of the demands by repeating steps (a), (b), (c) and (d) until the goals are met,
   (f) providing each said single feasible pattern and the associated multiplicity value as a recommended solution, and
   (g) allocating the common resource among the plurality of demands in accordance with the recommended solution.

2. The method defined in claim 1 wherein the step of generating a plurality of feasible patterns further comprises the steps of:
   (h) generating a plurality of random patterns as possible candidates for the recommended solution, and
   (i) selecting as the plurality of feasible patterns those ones of the random patterns which satisfy the constraints of the common resource.

3. The method defined in claim 1 wherein the step of generating a multiplicity value further comprises the steps of:
   (h) responsive to one of the feasible patterns and to the demands, generating a plurality of multiplicity ratios as candidates for the multiplicity value,
   (i) responsive to the multiplicity ratios, generating the multiplicity value for the feasible pattern to be the integer part of the smallest multiplicity ratio for the feasible pattern, and
   (j) repeating steps (h) and (i) for all feasible patterns.

4. The method defined in claim 1 wherein the step of reducing the plurality of feasible patterns to a single feasible pattern further comprises the steps of:
   (h) generating the residual demand for each feasible pattern,
   (i) generating an evaluation ratio as a function of the associated multiplicity value and the residual demand,
   (j) comparing the evaluation ratios for each feasible pattern, and
   (k) responsive to the smallest evaluation ratio, appending the corresponding residual demand, feasible pattern, and multiplicity value to the partial recommended solution.

5. Apparatus for allocating a constrained common resource among a plurality of demands for the resource, said demands having different levels of demand said apparatus comprising
   means for generating a random distribution based on the plurality of demands for the resource,
   means for generating as a function of the random distribution a plurality of feasible patterns each indicative of allocating the resource among the plurality of demands,
   means for generating a multiplicity value for each of said feasible patterns as a function the levels of the demands,
   means for processing each said multiplicity value and its corresponding feasible pattern to reduce the plurality of feasible patterns to a single feasible pattern which meets a set of goals and which can be included in a partial recommended solution of allocating the resource, thereby reducing the levels of the demands to respective residual levels, means for repeating the generating and processing using the residual levels of the demands until the goals are met, means for providing each said single feasible pattern and the associated multiplicity value as a recommended solution, and means for allocating the common resource among the plurality of demands in accordance with the recommended solution.

6. The apparatus defined in claim 5 wherein the means for generating a plurality of feasible patterns further comprises:

means responsive to the random distribution for generating a plurality of random patterns as possible candidates for the recommended solution, and means responsive to the random patterns for selecting generating as feasible patterns those ones of the random patterns, which satisfy the constraints of the common resource.

7. The apparatus defined in claim 5 wherein the means for generating a multiplicity value further comprises:

means responsive to the feasible patterns and to the demands for generating a plurality of multiplicity ratios as candidates for the multiplicity value, means responsive to the multiplicity ratios for generating the multiplicity value for the feasible pattern to be the integer part of the smallest multiplicity ratio for the feasible pattern, and means for repeating the generating for all feasible patterns.

8. The apparatus defined in claim 5 wherein the means for reducing the plurality of feasible patterns to a single feasible pattern further comprises:

means for generating the residual demand for each feasible pattern, means for generating an evaluation ratio as a function of the associated multiplicity value and the residual demand, means for comparing the evaluation ratios for each feasible pattern, and means responsive to the smallest evaluation ratio for appending the corresponding residual demand, feasible cut pattern, and multiplicity value to the partial recommended solution.

* * * * *